United States Patent
Poplingher et al.

(10) Patent No.: US 6,185,676 B1
(45) Date of Patent: *Feb. 6, 2001

(54) METHOD AND APPARATUS FOR PERFORMING EARLY BRANCH PREDICTION IN A MICROPROCESSOR

(75) Inventors: Mitchell Alexander Poplingher, Campbell; Carl Scafidi, Sunnyvale; Tse-Yu Yeh, Milpitas; Wenliang Chen, Sunnyvale, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/940,435

(22) Filed: Sep. 30, 1997

(51) Int. Cl.[7] .................................................... G06F 15/00
(52) U.S. Cl. ............................. 712/239; 712/233; 712/238
(58) Field of Search ........................ 395/800.23, 800.01, 395/800.24, 581, 585, 586; 712/23, 24, 1, 234, 238, 239, 233

(56) References Cited

U.S. PATENT DOCUMENTS

| | | | |
|---|---|---|---|
| 5,136,697 | * | 8/1992 | Johnson .................................. 395/586 |
| 5,617,549 | * | 4/1997 | DeLano ................................. 395/382 |
| 5,721,855 | * | 2/1998 | Hinton et al. .......................... 395/394 |
| 5,832,260 | * | 11/1998 | Arora et al. ........................... 395/586 |
| 5,842,008 | * | 11/1998 | Gochman et al. .................... 712/240 |
| 5,954,815 | * | 9/1999 | Joshi et al. ............................ 712/237 |

\* cited by examiner

*Primary Examiner*—Meng-Ai T. An
*Assistant Examiner*—Mackly Monestime
(74) *Attorney, Agent, or Firm*—Blakely, Sokoloff, Taylor & Zafman LLP

(57) ABSTRACT

A pipelined microprocessor having a branch prediction unit implemented in an instruction pointer generation stage of the microprocessor. The branch prediction unit includes a memory device having at least a first entry configured to hold at least a part of a memory address of a pre-selected branch instruction and at least a part of a memory address of a branch target corresponding to the pre-selected branch instruction. The branch prediction unit compares an instruction pointer of an instruction to be executed with the memory address of the pre-selected branch instruction. In response to a match between the instruction pointer and the memory address of pre-selected branch instruction, the unit causes the microprocessor to fetch an instruction corresponding to the branch target. In one embodiment, the instruction pointer generation stage of the microprocessor is implemented as a first stage of the pipelined microprocessor. In addition, the branch prediction unit is compares the instruction pointer and the memory address of the pre-selected branch instruction during a single clock cycle in which the instruction pointer is generated.

33 Claims, 5 Drawing Sheets

METHOD AND APPARATUS FOR PERFORMING EARLY BRANCH PREDICTION IN A MICROPROCESSOR

FIELD OF THE INVENTION

The invention relates to a method and apparatus in a microprocessor for performing branch prediction. More specifically, he invention relates to performing branch prediction in the instruction pointer generation stage (i.e., first stage) of a pipelined microprocessor.

BACKGROUND OF THE INVENTION

Microprocessors often employ the use of pipelining to enhance performance. Within a pipelined microprocessor, the functional units necessary for executing different stages of an instruction operate simultaneously on multiple instructions to achieve a degree of parallelism leading to performance increases over non-pipelined microprocessors.

As an example, an instruction fetch unit, an instruction decode unit and an instruction execution unit may operate simultaneously. During one clock cycle, the instruction execution unit executes a first instruction while the instruction decode unit decodes a second instruction and the fetch unit fetches a third instruction.

During a next clock cycle, the execution unit executes the newly decoded instruction while the instruction decode unit decodes the newly fetched instruction and the fetch unit fetches yet another instruction. In this manner, neither the fetch unit nor the decode unit need to wait for the instruction execution unit to execute the last instruction before processing new instructions. In state-of-the-art microprocessors, the steps necessary to fetch and execute an instruction are sub-divided into a larger number of stages to achieve a deeper degree of pipelining.

A pipelined CPU operates most efficiently when the instructions are executed in the sequence in which the instructions appear in the program order. Unfortunately, this is typically not the case. Rather, computer programs typically include a large number of branch instructions, which, upon execution, may cause instructions to be executed in a sequence other than as set forth in the program order.

More specifically, when a branch instruction is encountered in the program flow, execution continues either with the next sequential instruction or execution jumps to an instruction specified as the "branch target". Typically the branch instruction is said to be "Taken" if execution jumps to an instruction other than the next sequential instruction, and "Not Taken" if execution continues with the next sequential instruction.

Branch instructions are either unconditional, meaning the branch is taken every time the instruction is executed, or conditional, meaning the branch is dependent upon a condition. Instructions to be executed following a conditional branch are not known with certainty until the condition upon which the branch depends is resolved.

However, rather than wait until the condition is resolved, state-of-the-art microprocessors may perform a branch prediction, whereby the microprocessor predicts whether the branch will be Taken or Not Taken, and if Taken, predicts the target address for the branch. If the branch is predicted to be Taken, the microprocessor fetches and speculatively executes the instructions found at the predicted branch target address. The instructions executed following the branch prediction are "speculative" because the microprocessor does not yet know whether the prediction is correct.

In addition, as state-of-the-art microprocessors continue to push the standard of performance for today's computer systems to greater heights, the microprocessor's clock frequency (i.e., processing speed) continues to increase. As a result, less time is available for actual computations within each pipeline stage. Most microprocessors have compensated by increasing the number of stages in the pipelined core, while decreasing the levels of logic at each stage.

The tradeoff for the deeply pipelined solutions is the increasing performance penalty for "taking" branch instructions. More specifically, the microprocessor typically resolves branch instructions at the back-end of the pipeline. Therefore, if a branch instruction is determined, by the back-end of the pipeline, to be taken, then all instructions presently in the pipeline, behind the taken branch instruction, are typically flushed (i.e., disregard).

The processor thereafter begins fetching and executing instructions at the branch target address as specified by the taken branch instruction. The apparent unnecessary processing of the instructions that have been flushed, because of the branch instruction being taken, is therefore considered to be the "penalty" of the branch instruction.

Thus, maintaining a competitive performance with a microprocessor having a high clock frequency places a significant emphasis on branch prediction units to curve the penalty of branch instructions being taken.

SUMMARY OF THE INVENTION

The present invention provides a pipelined microprocessor having a branch prediction unit implemented in an instruction pointer generation stage of the microprocessor.

BRIEF DESCRIPTION OF THE DRAWINGS

The present invention is illustrated by way of example and not limitation in the figures of the accompanying drawings, in which.

DETAILED DESCRIPTION

The present invention provides a method and apparatus for performing branch prediction in the instruction pointer generation stage of a pipelined microprocessor.

Figure 1:
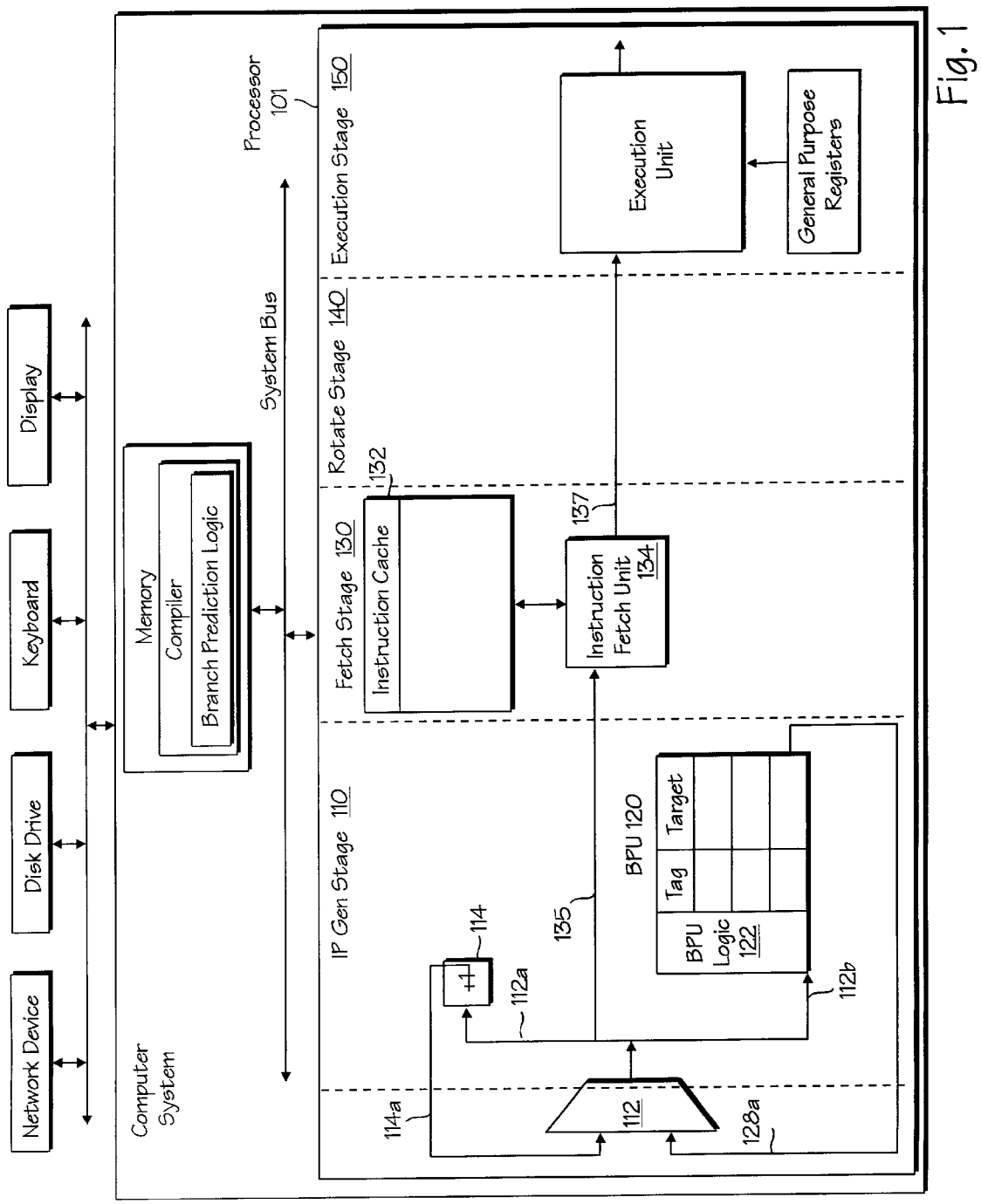
FIG. 1 illustrates a computer system having a pipelined microprocessor configured to make branch predictions in a first stage of the pipelined microprocessor, according to one embodiment of the invention.

FIG. 1 illustrates an exemplary computer system implementing one embodiment of the present invention. As shown, the computer system includes a processor 101 for executing instructions and performing other functions to operate the computer system. The processor, as shown, executes several instructions in parallel in a pipelined configuration, as described in the Background.

As shown in FIG. 1, the processor 101 includes an instruction pointer generation (IP Gen) stage 110, a fetch stage 130, a rotate stage 140, and an execution stage 150. Each of the pipelined stages shown in the microprocessor 101 may include varying levels of logic. Alternatively, the pipeline stages may be sub-divided into a larger number of stages. Moreover, additional pipeline stages, such as a decoding stage or a write back stage, may also be used in microprocessor 101, but are not shown in FIG. 1 in order to not obscure illustration of the present invention.

The IP Gen stage 110, as shown in FIG. 1, selects instruction pointers (e.g., memory addresses) which identify the next instruction in a program sequence that is to be fetched and executed by the microprocessor. Typically, the IP Gen stage simply increments the memory address of the most recently fetched instruction by a predetermined amount (e.g.,+1), each clock cycle.

However, in the case of an exception, or when a branch instruction is "taken", the IP Gen stage may select an instruction pointer identifying an instruction that is not the next sequential instruction in the program order. In the present invention, the IP Gen stage also predicts whether a branch instruction is taken, which helps to significantly decrease branch penalties.

The fetch stage 130, as shown in FIG. 1, accepts instruction pointers from the IP Gen stage and fetches the respective instruction from memory (e.g., Instruction Cache 132), or possibly an alternative storage location. The rotate stage 140 performs miscellaneous instruction processing operations, which are described in further detail below. The execution stage 150 performs an operation as specified by an instruction. In alternative embodiments, the pipelined stages described above may also include additional operations without departing from the present invention.

Figure 2:
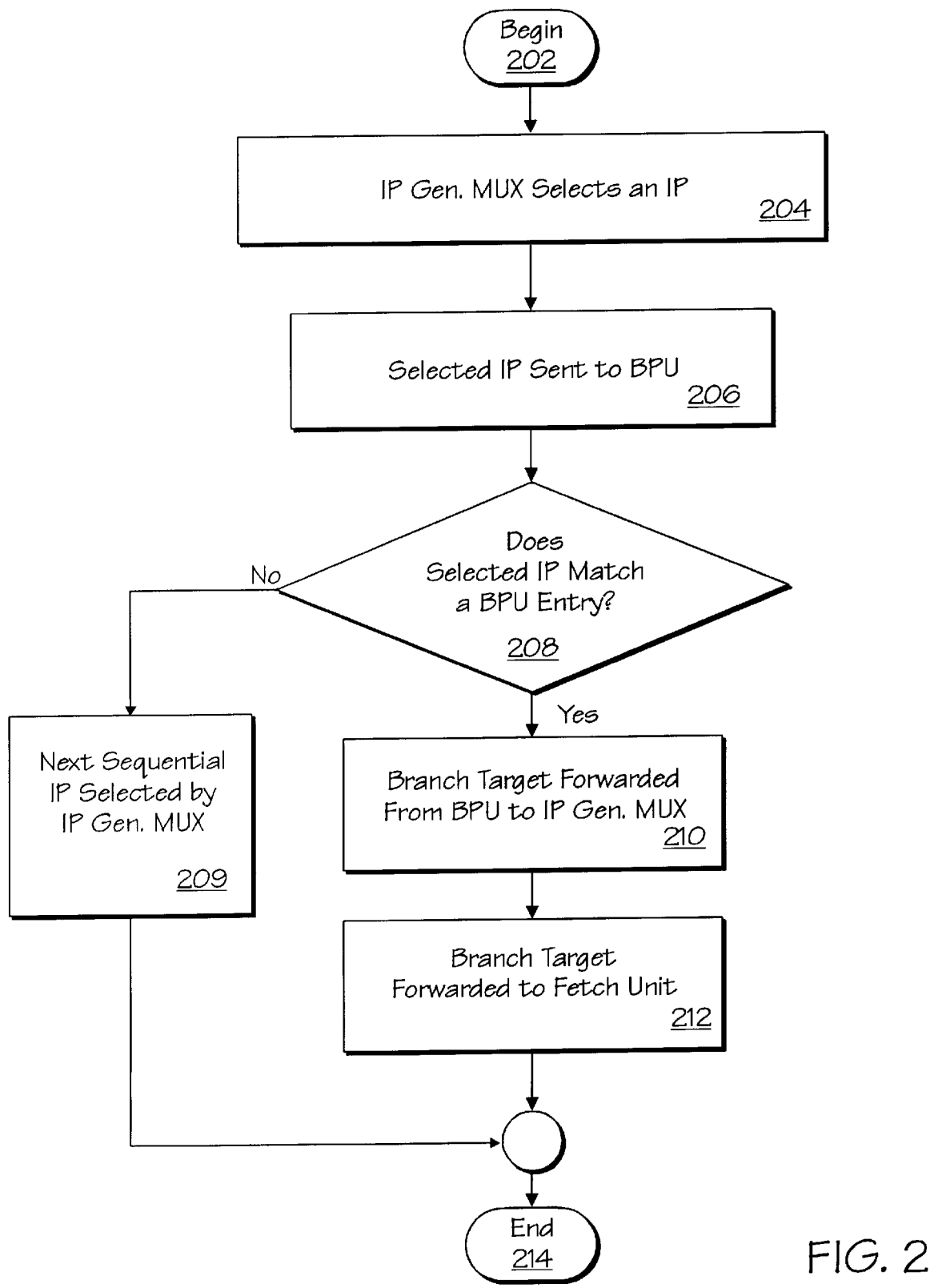
FIG. 2 illustrates a flow diagram describing the steps of predicting, in a first stage of a pipelined microprocessor, whether a branch instructions will be taken, according to one embodiment of the invention.

FIG. 2 provides a flow diagram describing the steps of the computer system in FIG. 1 performing early branch prediction, according to one embodiment of the present invention. The steps of the flow diagram illustrated in FIG. 2, are discussed below with reference to the exemplary computer system shown in FIG. 1. Flow of the invention begins in step 202 and ends in step 214. Flow passes from step 202 to step 204.

In step 204, the IP Gen mux 112 selects an instruction pointer from a set of signal inputs, each of which are configured to provide an instruction pointer to the IP Gen mux 112. The signal inputs of the IP Gen mux 112 may be pre-assigned with respective priorities to assist the IP Gen mux 112 in selecting which signal input will pass through the mux 112 onto the Fetch Unit 134.

As shown in FIG. 1, the IP Gen mux 112 receives an instruction pointer from signal line 114a. The instruction pointer provided via signal line 114a is generated by the incrementer circuit 114, which receives a copy of the most recent instruction pointer from the signal path 112a. The incrementer circuit may be configured to increment the present instruction pointer by a predetermined amount, to obtain the next sequential instruction from a program sequence presently being executed by the microprocessor.

The IP Gen mux 112 is also shown to be receiving an instruction pointer from the branch prediction signal line 128a. The instruction pointer provided via the branch prediction signal line 128a is generated by the Branch Prediction Unit (BPU) 120 of the present invention, which is discussed in more detail below. In summary, the branch prediction signal line 128a provides the IP Gen mux with the branch target for a branch instruction, which the BPU has predicted to be taken.

Additional signal input lines may be received by the IP Gen mux 112, without departing from the scope of the invention. For example, signal lines to account for detecting exceptions and for correcting branch predictions may also be received by the IP Gen mux 112.

In step 206, a copy of the instruction pointer selected by the IP Gen mux is forwarded to the Branch Prediction Unit (BPU) 120, via signal line 112b. (Hereinafter, the instruction pointer "selected" by the IP Gen mux will be referred to as "the IP".) The BPU is a storage device having one or more entries, with each entry of the BPU capable of storing data identifying a branch instruction and data identifying the branch target of the branch instruction.

In one embodiment, the branch instructions stored in the BPU are pre-selected by a compiler as branch instructions that will be taken. The compiler, as shown stored in the memory of FIG. 1, typically includes a sequence of instructions that translates source code of a program written in a high-level language into executable machine code. In one embodiment of the present invention, the compiler further includes an additional set of instructions that provides branch prediction logic, which identifies branch instructions that are "likely to be taken" (i.e., pre-selected branch instructions). The BPU is thereafter updated with branch instructions identified as likely to be taken, as is discussed in more detail below.

The branch prediction logic of the compiler used to identify branch instructions that are likely to be taken can vary within the scope of the invention. Moreover, the logic used to identify branch instructions that are likely to be taken, may be implemented in devices other than the compiler (e.g., a binary translator) without departing from the scope of the invention.

In one embodiment, each entry of the BPU includes a tag field and a target field, as shown in FIG. 1. The tag field of each entry in the BPU is configured to store at least a portion of an instruction pointer (e.g., memory address) identifying a branch instruction. The target field is configured to store at least a portion of the instruction pointer for the target of the branch instruction identified in the tag field of the same BPU entry. Moreover, in one embodiment, the entries of the BPU do not include a separate field to assist in the prediction of whether the branch instruction is taken. If a branch instruction is present in the BPU, it is considered to be taken. As a result, predicting whether the branch instruction is taken requires less time.

In one embodiment, the IP selected by the IP Gen mux consist of sixty-four bits (e.g., 63:0, with 0 being the least significant bit, and 63 being the most significant bit). The IP bits [4.0] specify the address of the respective instruction within a line of memory (e.g., the location within a cache line). The remaining bits of an instruction pointer are used to identify the line of memory storing the respective instruction.

In one embodiment, the tag fields of the BPU entries include twenty-two bits of a branch instruction's memory address (e.g., bits 62:61 and 24:5 of the instruction pointer). The target field of each entry includes forty bits of the branch instruction's target. In alternative embodiments, the size of the tag and target fields of a BPU entry may vary without departing from the scope of the invention. Moreover, the actual size of the instruction pointer may also vary without departing from the scope of the invention.

Once the BPU receives the IP from the IP Gen mux, in step 208, the BPU logic 122 of the BPU 120 will compare a portion of the IP with the tag field of each entry in the BPU.

The BPU logic 122 performs the comparison to determine if the IP corresponds to a branch instruction that was preselected as "likely to be taken." In one embodiment of the present invention, the IP gen mux selects the IP and the BPU performs the compare operation within the same clock cycle. Alternatively, the compare operation of the BPU may occur in a clock cycle following the selection of the IP.

If no match is found between the IP and the tag fields of the BPU 120, in step 209 the IP Gen mux will proceed to select the next sequential IP as the next instruction to be fetched. On the other hand, if the BPU logic 122 detects a match between the IP and a tag field in the BPU 120, in step 210, a copy of the branch target corresponding to the matching tag field, is forwarded to the IP Gen mux, via the branch prediction signal line 128a. Assuming the branch prediction signal line 128a has the highest priority among the "asserted" signal lines received by the IP Gen mux, in step 212, the branch target is passed onto the Fetch Unit 134 to begin fetching instructions at the respective address of the branch target. After the instructions are received, they are forwarded to the execution unit via signal line 137 to be executed.

As a result of performing branch prediction very early in the pipelined microprocessor (i.e., in the IP Gen stage), the branch penalty is significantly reduced. That is, typically an instruction is first fetched and decoded (in order to identify it as a branch instruction) before a branch prediction may occur. As a result, the conventional branch prediction still incurs a branch penalty equal to the number of clock cycles it takes to fetch and decode an instruction.

Alternative Embodiment

Figure 3:
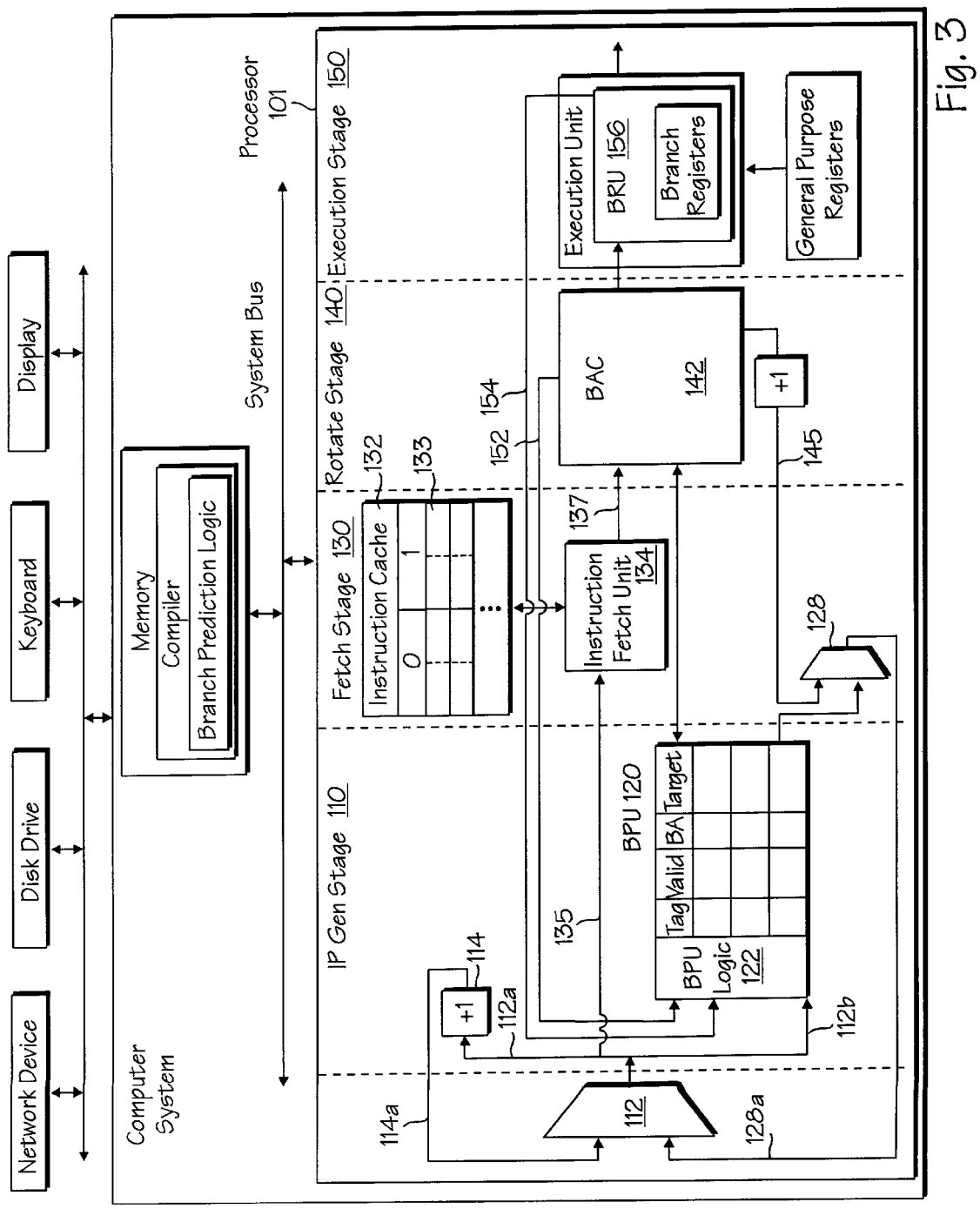
FIG. 3 illustrates a computer system having a pipelined microprocessor configured to validate branch predictions made in a first stage of the pipelined microprocessor, according to one embodiment of the invention.

An alternative embodiment of the present invention includes additional features provided to validate branch predictions made by the BPU 120. FIG. 3 illustrates an exemplary computer system which includes the branch validation features, according to one embodiment of the present invention.

More specifically, as shown in FIG. 3, each BPU 120 entry further includes a valid field and a bundle address (BA) field which are used to increase the accuracy and validate branch predictions performed by the BPU, as is discussed in more detail below. In one embodiment, the valid field and the BA field each consist of 1 bit fields. In other embodiments, however, the size of the valid and BA fields may vary with out departing from the scope of the invention.

Figure 4A:
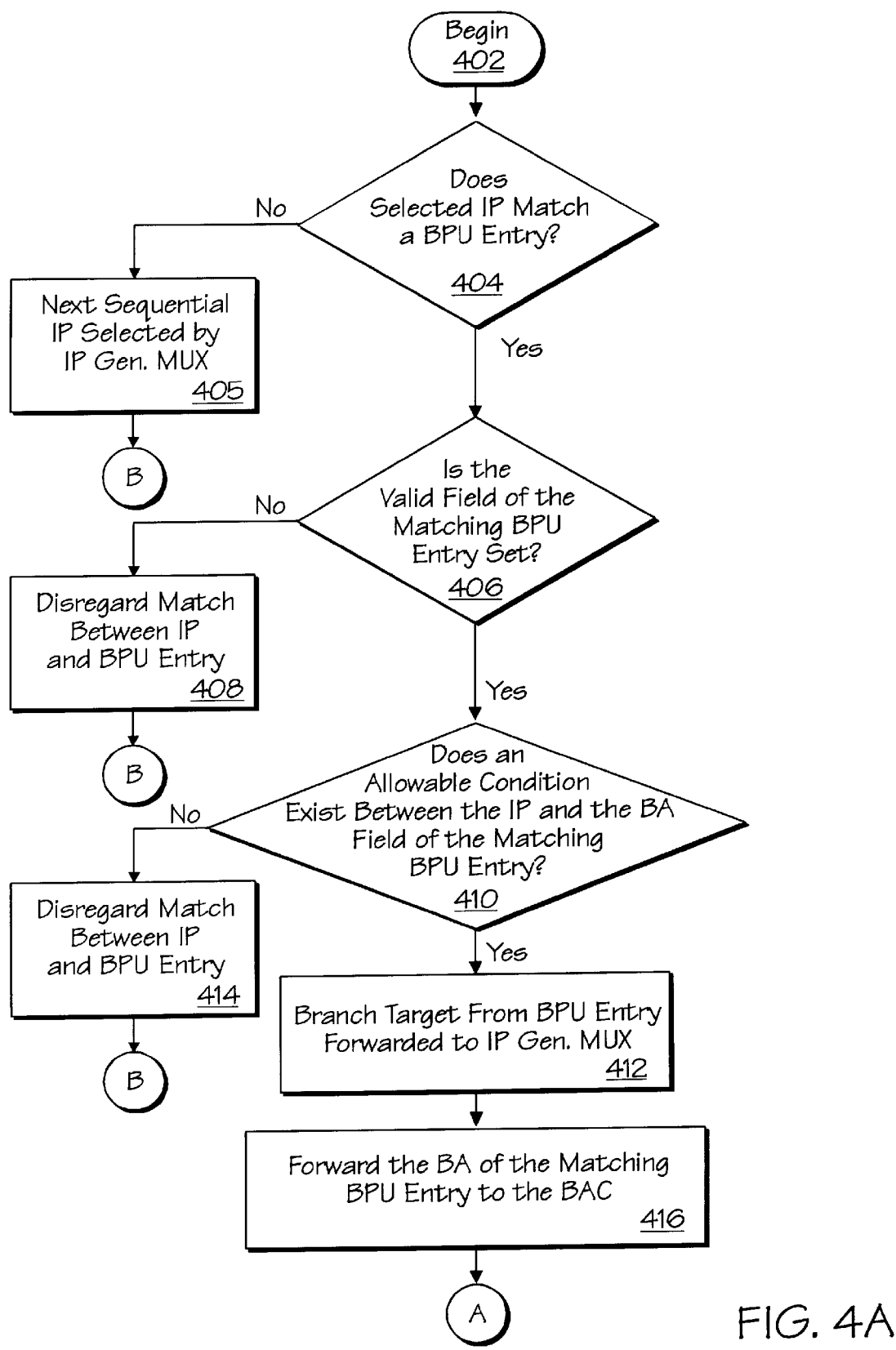
FIGS. 4a–4b illustrate a flow diagram describing the steps of validating branch predictions that were made in a first stage of a pipelined microprocessor, according to one embodiment of the invention.
Figure 4B:
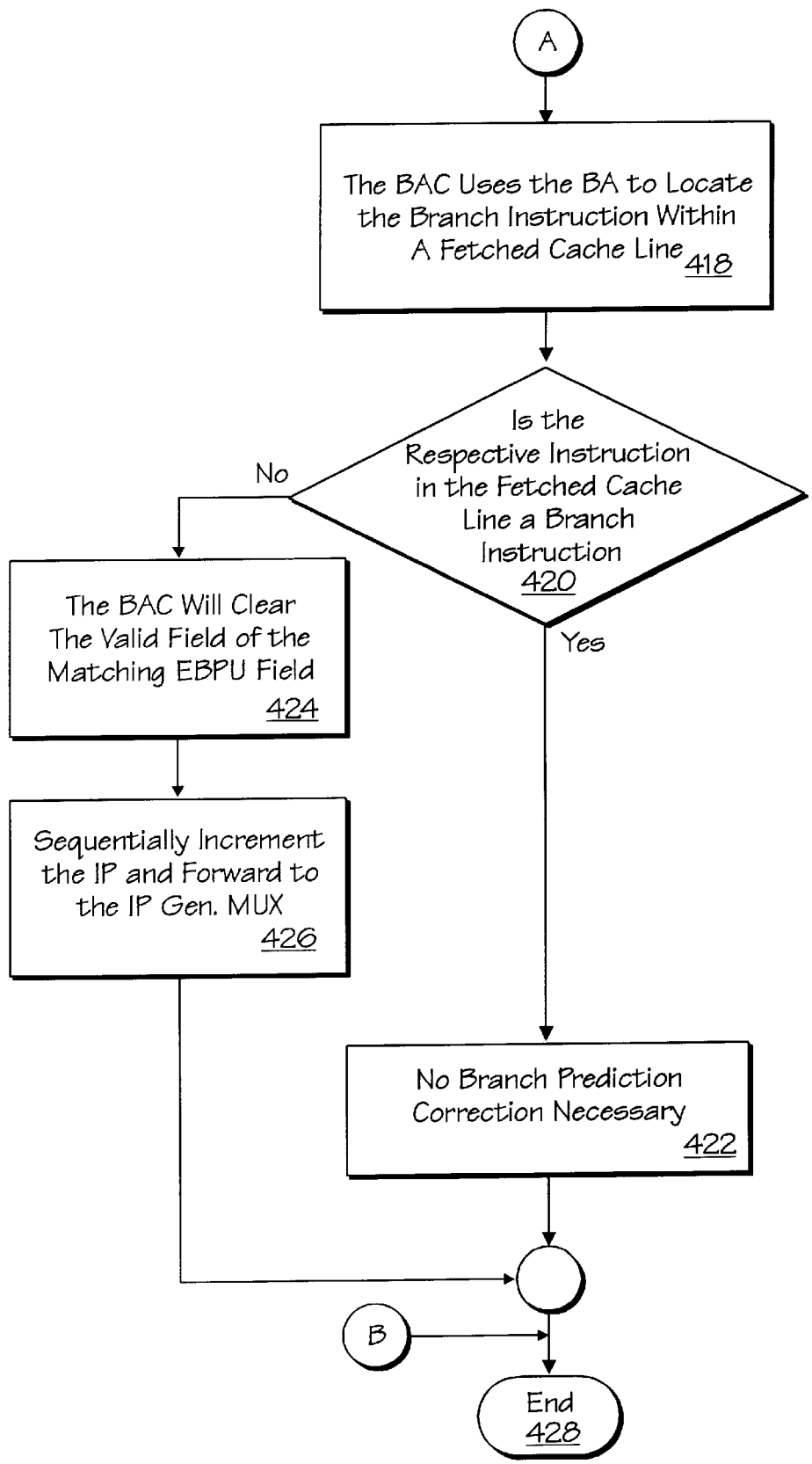

FIGS. 4a–b illustrate a flow diagram describing the steps of performing the branch validation according to the one embodiment of the present invention. The steps of the flow diagram illustrated in FIGS. 4a–4b are discussed below with reference to the exemplary computer system shown in FIG. 3.

Flow of the invention begins in step 402 and ends in step 428. Flow passes from step 402 to step 404. In step 404, upon receipt of the IP from IP Gen mux 112, the BPU logic 122 will compare a portion of the IP with the tag field of each entry in the BPU 120, as is described above in step 208 of FIG. 2. Once again, if no match is found between the IP and the tag fields of the BPU 120, in step 405 the IP Gen mux will proceed to select the next sequential IP as the next instruction to be fetched.

Conversely, if a match is detected, the BPU logic 122, in step 406, will read the valid field of the BPU entry which matches with the IP. If the valid field is not set (e.g., has logical value of 0), in step 408 the BPU logic 122 will consider the respective BPU entry to be "invalid" and will disregard the match between the IP and the tag of the respective BPU entry. Moreover, the branch target of the respective BPU entry will not be forwarded to the IP Gen Mux.

On the other hand, if the valid field of the matching BPU entry is set (e.g., has a logical value of 1), in step 410, the BPU logic 122 will proceed to perform a logical comparison between a predetermined portion of the IP (e.g., IP) and the BA field of the matching BPU entry. If an "allowable condition" is present, in step 412, the branch target of the matching BPU entry will be forwarded to the IP Gen mux. Otherwise, in step 414, the BPU will disregard the match between the IP and the tag of the BPU entry.

More specifically, in one embodiment, the BA field indicates where the respective branch instruction is stored within a line of cache memory, which is configured to support a super scalar microprocessor. A super scalar microprocessor is able to initiate the execution of multiple instructions per clock cycle, wherein the instructions are not interdependent and do not use the same execution resources.

For example, each line of the instruction cache 132 shown in FIG. 3 includes multiple instructions (e.g., six instructions). More over, in response to a fetch operation by the Fetch Unit 134, the instruction cache 132 may respond (i.e., in the case of a "hit") by providing a full line of cache to the Fetch Unit 134.

The instructions within a line of cache are grouped as separate "bundles." For example, as shown in FIG. 3, the first three instructions in a cache line 133 may be addressed as bundle 0, and the second three instructions may be address as bundle 1. Each of the instructions within a bundle are independent of each other (i.e., can be simultaneously issued for execution).

The BA field provided in the BPU entries is used to identify the bundle address of the branch instruction which corresponds to the respective BPU entry. For example, in one embodiment, the BA identifies whether the branch instruction is stored in the first or second bundle of a particular cache line.

Once again, in one embodiment of the present invention, the BPU logic 122 performs a logical comparison between the BA field of a matching BPU entry and a predetermined portion of the IP to determine if an "allowable condition" is present. For example, in one embodiment, the fifth bit position of the IP (e.g. IP[4]) is compared with the BA field of a matching BPU entry.

In one embodiment, an allowable condition is present when IP [4] is not greater than the BA. Such an allowable condition helps prevent the apparent unnecessary prediction of a branch instruction, which may not be executed. That is, considering less than all of the IP is considered when doing a comparison against the tags of the BPU 120, it is possible to have a match with a tag, which may not be a true match.

Nevertheless, a match between the IP and a tag of the BPU indicates a particular line of cache, which includes a branch instruction corresponding to the respective BPU entry, may about to be executed. Specifically, if the bundle address of the IP is not greater than the BA field of the matching BPU entry, then the branch instruction in the respective cache line is soon to be executed. Hence, a performance benefit can be achieved by proceeding to fetch the target of the branch instruction.

As discussed above, if an "allowable condition" is present, in step 412, the branch target of the matching BPU entry will be forwarded to the IP Gen mux. Otherwise, in step 414, the BPU will disregard the match between the IP and the tag.

In one embodiment, the branch target forwarded from the BPU is initially sent to a Branch Prediction (BP) resteer mux 128, before it is sent to the IP Gen mux. The BP resteer mux 128, as shown in FIG. 3, may also receive instruction pointers from other branch prediction devices. In one embodiment, the input signal lines received by the BP resteer mux will be prioritized to determine which input signal line will be allowed to pass through the BP resteer mux onto the IP Gen mux.

In addition to forwarding a branch target to the BP resteer mux, upon detecting a match between the IP and a tag of the BPU, the BA of the matching BPU entry is forwarded, in step 416, to the Branch Address Calculator (BAC) 142. The BAC 142 is shown in FIG. 3 to be located in the rotate stage 140 the microprocessor 101. The BAC of the present invention is also configured to received a cache line from the Fetch Unit 134, via signal line 137.

The IP selected by the IP Gen mux is also forwarded to the Fetch Unit 134, via data signal line 135. Once the IP is received by the Fetch Unit 134, the cache line corresponding to the IP is fetched from the Instruction Cache 132. The cache line received from the instruction cache is forwarded to the BAC, via data signal line 137.

Upon receipt of the BA, in step 418, the BAC will read the BA to determine where the pre-selected branch instruction (identified in the matching BPU entry) is located in the next cache line to be received by the BAC (e.g., the first or second bundle of the cache line). In one embodiment, it is predetermined where the branch instruction is located within a bundle of a cache line (e.g., in a bundle of three instructions, the branch instruction will be stored as the second instruction).

In alternative embodiments, the BA may include additional bits to more specifically identify the address of the branch instruction within a cache line. Therefore, the branch instruction would not be limited to a specific instruction position within a bundle.

After the BAC determines the address of the pre-selected branch instruction within the cache line, and has received the respective cache line from the Fetch Unit 134, in step 420 the BAC will decode the respective instruction to verify the IP truly corresponds to a branch instruction. If the instruction addressed by BA in the received cache line is a branch instruction, in step 422 no correction for the branch prediction is necessary.

Conversely, if the respective instruction in the cache line is not a branch instruction (i.e., the IP does not correspond to a branch instruction), in step 424 the BAC will send a message to the BPU to invalidate the respective BPU entry, to prevent similar mispredictions on the same BPU entry. Thereafter, the invalidated BPU entry will be overwritten by a new BPU entry.

In addition, in one embodiment, in step 426 the BAC will increment the IP by a predetermined amount and forward the incremented IP to the BP resteer mux 128, via data signal line 145. The data signal line 145 coming from the BAC will take priority over the data signal line from the BPU. As a result, the incremented IP will be forwarded to the IP Gen mux and passed to the fetch unit in order to correct the branch misprediction by fetching the instructions that sequentially follow the IP.

Updating the BPU Entries

In one embodiment of the present invention, the BPU is updated by the BAC and the Branch Resolution Unit (BRU). For example, when the compiler translates a "high-level" branch instruction into a machine level instruction for execution, the compiler will provide a "predict instruction" to be executed prior to the respective branch instruction. The predict instruction can be used to update the BPU.

In one embodiment, the predict instruction includes two immediate operands. The first immediate operand is an offset of the respective branch instruction's memory address. The second immediate operand is an offset of the branch instruction's target address. Alternatively, the predict instruction may identify a General Purpose Register (GPR) storing the address of the branch instruction and/or the branch target.

The predict instruction may also include an "important hint" (ih) field, which when set by the branch prediction logic of the compiler, indicates the respective branch instruction is likely to be taken. The branch prediction logic of the compiler may statically set the ih field of a predict instruction based on the op code of the respective branch instruction (e.g., unconditional branch, return branch, conditional branch, etc.). Alternatively, the branch prediction logic may generate a profile for the respective branch instruction, and set the ih field of the predict instruction, according to the history of the respective branch instruction.

As a result, in one embodiment, when the BAC receives a predict instruction which has an ih field that is set, the BAC will forward, via data path 152, at least part of the branch instruction's memory address and the target of the branch instruction to BPU, as shown in FIG. 3. Upon receipt of the data, the BPU will proceed to update an entry of the BPU, with the data received from the BAC.

In addition, the BPU entries can also be updated by the Branch Resolution Unit (BRU) 156, which is shown in FIG. 3 to be included in the execution unit. More specifically, certain branch instructions are referred to as indirect branching instructions, wherein the branch target is stored in a branch registers. In one embodiment, the branch registers are provided in the BRU, as shown in FIG. 3.

Special instructions, prior to the indirect branch instructions, are used to store the branch targets in the branch registers. That is, when the compiler is translating a "high level" indirect branch instruction into machine level instruction, the compiler will generate a set_BR instruction, that is to be executed prior the actual indirect branch instruction. When executed, the set_BR instructions will write the target address of an indirect branch instruction into a branch register.

For example, the set_BR instruction may transfer the value of the branch target value from a GPR to a BR. Alternatively, the branch target may be included in the set_BR instruction as an offset, which could be added to the memory address of the set_BR instruction to obtain the address of the respective branch target. The address of the branch target could then be written into the BR to be used by the indirect branch instruction which follows.

In one embodiment, the set_BR instructions further identifies the address of the respective indirect branch instruction. For example, the address may be included as an offset which, once again, can be added to the memory address of the respective set_BR instruction to obtain the address of the indirect branch instruction. In addition, in one embodiment, the set_BR instruction includes the "important hint" (ih) field, as described above.

As a result, in one embodiment of the present invention, when the BRU receives a set_BR instruction, the BRU sends to the BPU, via data path 154, at least part of the respective branch instruction's memory address and at least part of the branch instruction's target. In addition, the BRU also sends the ih field of the set_BR instruction. If the ih field is set, the BPU will proceed to update an entry of the BPU with the data received from the BRU. Otherwise, the BPU will disregard the data received from the BRU. Alternatively, the BRU could read the ih field of the set_BR instruction to determine whether to transmit the data to the BPU.

In the foregoing specification the invention has been described with reference to specific exemplary embodiments thereof. It will, however, be evident that various modifications and changes may be made thereto without departing from the broader spirit and scope of the invention.

What is claimed is:

1. A pipelined microprocessor comprising a branch prediction unit to operate in conjunction with an instruction pointer generation stage of said microprocessor, said microprocessor having a fetch stage separate and subsequent from said instruction pointer generation stage, said branch prediction unit to perform branch prediction on a first instruction in parallel with said instruction pointer generation stage generating an instruction pointer for a second instruction, said second instruction being sequential to said first instruction in a program sequence.

2. The microprocessor of claim 1, wherein said branch prediction unit includes a memory device having at least a first entry to hold at least a part of a memory address of a pre-selected branch instruction and at least a part of a memory address of a branch target corresponding to said pre-selected branch instruction.

3. The microprocessor of claim 2, wherein said branch prediction unit compares an instruction pointer of an instruction to be executed with said memory address of said pre-selected branch instruction, and, in response to a match between said instruction pointer and said memory address of said pre-selected branch instruction, said branch prediction unit fetches an instruction corresponding to said branch target.

4. The microprocessor of claim 3, wherein said instruction pointer generation stage of said processor is implemented as a first stage of said pipelined microprocessor.

5. The microprocessor of claim 4, wherein said branch prediction unit compares said instruction pointer and said memory address of said pre-selected branch instruction during a clock cycle in which said instruction pointer is generated.

6. The microprocessor of claim 4, wherein said processor is a super scalar processor;
said processor includes an instruction cache having cache lines separated into bundles of instructions; and
said processor executes said instructions per bundle in parallel.

7. The microprocessor of claim 4, wherein said first entry of said memory device is further to hold a bundle address corresponding to said pre-selected branch instruction;
said microprocessor compares said bundle address from said first entry of said memory device with at least a portion of said instruction pointer of said instruction to be executed; and
in response to said portion of said instruction pointer exceeding said bundle address, said unit is to allow said processor to fetch an instruction sequentially following said instruction to be executed.

8. The processor of claim 7, wherein said microprocessor updates said first entry of said memory device based on an encoding of a predict instruction;

said predict instruction including a first field to hold at least a portion of a memory address corresponding to a second pre-selected branch instruction,
said predict instruction including a second field to hold at least a portion of a memory address corresponding to a branch target of said second pre-selected branch instruction,
and said predict instruction including an important hint (ih) field to indicate whether an entry of said memory device is to be updated with said first and second fields of said predict instruction.

9. The microprocessor of claim 8, wherein said ih field of said predict instruction is set by a compiler.

10. The microprocessor of claim 7, wherein said microprocessor includes a branch resolution unit (BRU) having a second memory device to hold branch target addresses; and
said branch resolution unit updates said first memory device of said branch prediction unit, in response to said BRU receiving an instruction to update said second memory device, said instruction to update having an ih field to indicate whether said first memory device is to be updated.

11. The microprocessor of claim 5, wherein said first entry of said first memory device further includes an valid field, said valid field being cleared in response to said processor determining said memory address of said pre-selected branch instruction in said first entry corresponds to a non-branching instruction.

12. A pipelined microprocessor comprising:
a means for performing branch prediction during an instruction pointer generation stage of said microprocessor, said microprocessor having a fetch stage separate and subsequent from said instruction pointer generation stage, said means for branch prediction unit to perform branch prediction on a first instruction in parallel with said instruction pointer generation stage generating an instruction pointer for a second instruction, said second instruction being sequential to said first instruction in a program sequence.

13. The microprocessor of claim 12, wherein said means for performing branch prediction includes a memory device having at least a first entry to hold at least a part of a memory address of a pre-selected branch instruction and at least a part of a memory address of a branch target corresponding to said pre-selected branch instruction.

14. The microprocessor of claim 13, wherein said means for performing branch prediction includes a means for comparing an instruction pointer of an instruction to be executed with said memory address of said pre-selected branch instruction; and
said means for performing branch prediction further includes a means for causing said microprocessor to fetch an instruction corresponding to said branch target in response to a match between said instruction pointer and said memory address of said pre-selected branch instruction.

15. The microprocessor of claim 13, wherein said instruction pointer generation stage of said processor is implemented as a first stage of said pipelined microprocessor.

16. The microprocessor of claim 15, wherein said means for performing branch prediction compares said instruction pointer and said memory address of said pre-selected branch instruction during a clock cycle in which said instruction pointer is generated.

17. The microprocessor of claim 15, wherein said microprocessor is a super scalar microprocessor;

said microprocessor includes an instruction cache having cache lines separated into bundles of instructions; and said microprocessor executes said instructions per bundle in parallel.

18. The microprocessor of claim 15, wherein said first entry of said memory device is further to hold a bundle address corresponding to said branch target;

said microprocessor further includes a means for comparing said bundle address from said first entry of said memory device with at least a portion of said instruction pointer of said instruction to be executed; and said means for performing branch prediction allows said processor to fetch an instruction sequentially following said instruction pointer of said instruction to be executed, in response to said portion of said instruction pointer exceeding said bundle address.

19. The microprocessor of claim 18, wherein said microprocessor includes a means for updating said first entry of said memory device based on an encoding of a predict instruction;

said predict instruction including a first field to hold at least a portion of a memory address corresponding to a second pre-selected branch instruction, said predict instruction including a second field to hold at least a portion of a memory address corresponding to a branch target of said second pre-selected branch instruction, and said predict instruction including an important hint (ih) field to indicate whether an entry of said memory device is to be updated with said first and second fields of said predict instruction.

20. The microprocessor of claim 19, wherein said ih field of said predict instruction is set by a compiler.

21. The microprocessor of claim 18, wherein said microprocessor includes a branch resolution unit (BRU) having a second memory device to hold branch target addresses; and said branch resolution unit includes a means for updating said first memory device of said branch prediction unit, in response to said BRU receiving an instruction to update said second memory device, said instruction to update having an ih field to indicate whether said first memory device is to be updated.

22. A method for predicting branch instructions implemented in a pipelined microprocessor, said method comprising:

generating an instruction pointer during an instruction pointer generation stage of said pipelined microprocessor, said microprocessor having a fetch stage separate and subsequent from said instruction pointer general stage; and predicting a branch instruction during said instruction pointer generation stage of said microprocessor, said predicting of said branch instruction performed on a first instruction in parallel with said instruction pointer generation stage generating an instruction pointer for a second instruction, said second instruction being sequential to said first instruction in a program sequence.

23. The method of claim 22, wherein said pipelined microprocessor includes a memory device having at least a first entry to hold at least a part of a memory address of a pre-selected branch instruction and at least a part of a memory address of a branch target corresponding to said pre-selected branch instruction.

24. The method of claim 23, wherein said method further includes:

comparing an instruction pointer of an instruction to be executed with said memory address of said pre-selected branch instruction; and in response to a match between said instruction pointer and said memory address of said pre-selected branch instruction, fetching an instruction corresponding to said branch target.

25. The method of claim 24, wherein said instruction pointer generation stage of said microprocessor is implemented as a first stage of said pipelined microprocessor.

26. The method of claim 25, wherein said comparing said instruction pointer and said memory address of said pre-selected branch instruction occurs during a clock cycle in which said instruction pointer is generated.

27. The method of claim 25, wherein said microprocessor is a super scalar processor and includes an instruction cache having cache lines separated into bundles of instructions;

said microprocessor is to execute said instructions per bundle in parallel; and said first entry of said memory device is to hold a bundle address corresponding to said branch target.

28. The method of claim 27, wherein said method further includes:

comparing said bundle address from said first entry of said memory device with at least a portion of said instruction pointer of said instruction to be executed; and in response to said portion of said instruction pointer exceeding said bundle address, allowing said processor to fetch an instruction sequentially following said instruction to be executed.

29. The method of claim 28, wherein said method further includes:

updating said first entry of said memory device based on an encoding of a predict instruction, said predict instruction including a first field to hold at least a portion of a memory address corresponding to a second pre-selected branch instruction, said predict instruction including a second field to hold at least a portion of a memory address corresponding to a branch target of said second pre-selected branch instruction, and said predict instruction including an important hint (ih) field to indicate whether said first entry of said memory device is to be updated with said first and second fields of said predict instruction.

30. The method of claim 29, wherein said field of said predict instruction is set by a compiler.

31. The method of claim 27, wherein said microprocessor includes a branch resolution unit (BRU) having a second memory device to hold branch target addresses.

32. The method of claim 31, where said method further includes:

updating said first memory device of said branch prediction unit, in response to said BRU receiving an instruction to update said second memory device, said instruction to update having an ih field to indicate whether said first memory device is to be updated.

33. The method of claim 27, wherein said method further includes invalidating said first entry of said first memory device in response to said processor determining said memory address of said pre-selected branch instruction in said first entry corresponds to non-branching instruction.

* * * * *